Oct. 7, 1969     A. S. WENDT     3,471,300
PROCESS FOR TREATING CLAMS
Filed Aug. 8, 1966
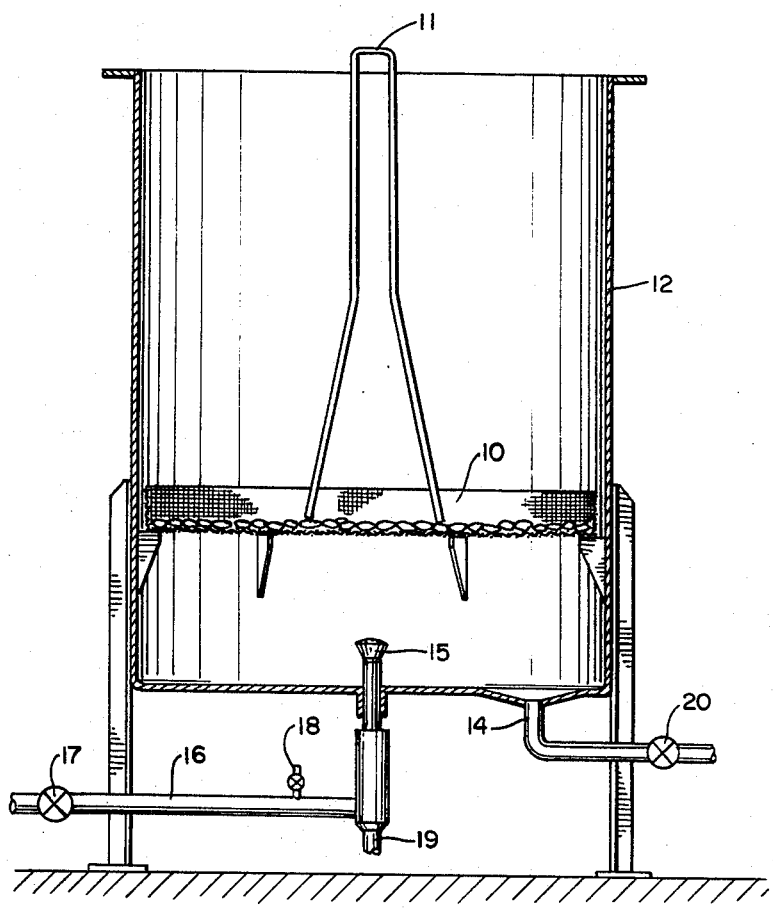
INVENTOR
ARTHUR S. WENDT
BY *Darley & Darley*
ATTORNEYS

United States Patent Office 3,471,300
Patented Oct. 7, 1969

3,471,300
PROCESS FOR TREATING CLAMS
Arthur S. Wendt, Teaneck, N.J., assignor to HCA Food Corporation, Brooklyn, N.Y., a corporation of New York
Filed Aug. 8, 1966, Ser. No. 571,681
Int. Cl. A22c 29/00
U.S. Cl. 99—111                                              8 Claims

ABSTRACT OF THE DISCLOSURE

A process for converting normally inedible clams to edible clams is described which comprises heating the clam meat such as that derived from mahogany clams with steam prior to sterilization to volatilize the matter contained therein which causes the undesirable odor and taste associated with the clam meat.

---

The present invention relates to novel edible clams and a method of converting normally inedible clams to edible clams suitable for food purposes.

More particularly, the present invention is concerned with edible mahogany clams (*Arctica islandica*), also known as black quahogs, and a process of converting normally inedible clams to edible clams by heating the clam meat to volatilize the matter therein which causes the undesirable odor and taste therein.

Prior to 1951, the primary source of clams canned for human consumption were the regular quahog clams (*Venus mercenari*). These clams are edible per se and are processed by steam treatment until the clam meat is cooked practically free of the shell. After such cooking the meat is removed from the shell mechanically or manually, washed and then cooked in a brine solution at 240° F. to sterilize the meat. The processing of these clams is quite simple because it does not require removal of the belly contents. The source of these quahog clams has rapidly diminished because they were being killed on the Florida west coast by the "Red tide"—a protozan.

About 1951, large beds of surf clams (*Spisula solidissima* and *Mactra solidissima*) were discovered. These clams, which are suitable for human consumption, immediately became popular and rapidly replaced the diminishing supply of quahog clams. Among the advantages offered by the surf clams over the quahog clams, which led to their success, is that their meat is tastier, i.e. sweeter, and yield a greater quantity of meat per bushel than quahog clams.

The processing of surf clams is different from that of quahog clams because it is necessary to remove their belly contents to render them suitable for human consumption. In general, surf clams are processed by washing them with cold water and subsequently treating the clams with hot water at temperatures of about 190° F. for about 45 seconds. This treatment opens the shell enough to permit shucking of the meat out of the shell. In this hot water treatment cooking of the meat has been intentionally avoided to prevent permeating the meat with the stench of the belly contents which imparts a foul taste thereto and renders it unusuable for food purposes. After the meat is shucked from the shell it is passed through a washing reel to remove sand. The meat is then debellied by squeezing the meat which forces the belly contents to pop out. After the belly contents have been removed the meat is subjected to numerous washings and ground to the desired size. The clam meat is pressure-cooked in a brine solution in the can to sterilize the meat.

In recent years there has been growing concern in the sea clam industry about the diminishing availability of surf clams off the eastern coast of the United States. Because of the rapid depletion of the supply of surf clams which threatens the entire clam industry, numerous studies were undertaken to locate new beds of surf clams in areas of the Atlantic Ocean along the eastern seaboard which had not previously been investigated. A research program was initiated in which the Fish and Wild Life Service of the United States Department of Interior outfitted a research boat for conducting exploratory work to survey parts of the Atlantic Ocean that have previously not been explored for clams. During the course of this research work there was found an apparently inexhaustible supply of mahogany clams, but surf clams were not found in quantities sufficient to replenish the diminishing supply. The mahogany clams, primarily found in waters of 120 to about 200 feet depth, were rejected because it had long been known that they are normally inedible. The meat obtained from these clams has a foul and fishy taste, rendering it unusable as a food product. Furthermore, processing of these clams is complicated by the fact that the clam shell has a black fuzzy growth which discolors the meat and further imparts an undesirable color and odor to the meat during steam or water treatment. Thus, while a new abundant supply of clams has been found, no techniques were available for converting such clams into a usable food product.

Accordingly, one aspect of the present invention is to provide a process for converting normally inedible mahogany clams into edible clams suitable for human consumption.

Another aspect of the present invention is to provide a new food product derived from edible mahogany clam meat.

A further aspect of the present invention is concerned with a process for the removal of undesirable odor and taste from clam meat heretofore considered normally inedible, by heat treatment of the clam meat to free the meat of matter which causes the undesirable taste and odor.

Yet another aspect of the present invention is to provide a process for rendering clams obtained from polluted beds suitable for human consumption.

An additional aspect of the invention is to employ a steam treatment process for removal of undesirable odor and taste associated with certain types of clam meat and to obtain as a by-product of said process clam juice free from foul or undesirable odor or taste and suitable for packaging with edible clam meat.

These and other aspects of the present invention will become apparent from a consideration of the following description in conjunction with the appended drawing, which is a diagram of an apparatus suitable for use in carrying out the process of the present invention.

According to the present invention, normally inedible mahogany clams are converted to edible clams suitable for human consumption in the manner described hereinafter.

Initially, it is necessary to remove the black fuzz growth on the shell of the mahogany clams. This can be accomplished mechanically as by employing a set of brushes which rotate, e.g. wire brushes. Obviously, other mechanical means can be employed to remove the black fuzz growth. It is essential that the black fuzz growth be removed prior to the subsequent step of steam or hot water treatment because the use of steam or hot water in the presence of the black fuzz growth causes black dye to discolor the clam meat and impart an undesirable taste and odor to the meat.

After removal of the black fuzz growth the clams, if desired, may be treated with steam or hot water to partially open the shell and facilitate separation of the meat from the shell. This treatment must be carefully controlled to keep the meat raw. As used herein, the term "raw" means before protein matter in the meat has partially or completely coagulated. The steam or hot water treatment should be for a period of not more than about 10 to 20 seconds. When the meat is cooked at this stage the belly contents impart an undesirable taste and odor to the meat and render it unusable for food purposes.

The next step involves complete removal of the meat manually or mechanically from the shell, i.e., shucking the clams. This step may be carried out according to the techniques well known in the clam industry which have heretofore been employed in connection with processing of surf clams. After the clam meat has been shucked, it is necessary to remove the belly contents from the meat because mahogany clams have a large belly whose contents are not edible. The removal of the belly contents may be accomplished by slitting the "peritoneum" (skin that holds the belly to the meat) in several places, manually tearing the belly away and washing the belly contents away, using jets of cold water. This treatment with cold water results in removal of belly contents and any undesirable belly odor and taste in the meat. After the belly contents have been removed and the meat washed, the meat, which is still raw, is ground with a grinder or cutter or the like.

According to the present invention the undesirable odor and taste associated with mahogany clams and other clams is removed by heat treatment of the clam meat to volatilize the undesirable odor and taste causing matter. Preferably, this phase of the process is carried out by steam treatment in an apparatus such as described in the drawing. That apparatus is employed in the following manner.

A suitable quantity of raw clam meat which has been debellied and washed with cold water is placed in a wire basket 10 provided with a handle 11 or the like, the basket supported inside of a heating column 12 provided with outlet 14 for recovering clam juice obtained during the steam treatment. The bottom of heating column 12 is provided with sparger 15 through which dry steam passes into heating column 12. The steam is fed into conduit 16 having steam valve 17, bleed valve 18 and condensate outlet 19. The condensate outlet 19 collects excess moisture in the steam and provides dry steam in heating column 12. The use of dry steam reduces the quantity of condensate collected through outlet 14 by opening valve 20 and thereby reduces dilution of the collected clam juice with water.

In carrying out the process of the present invention, dry steam is bled into the heating column 12 where a suitable quantity of clam meat has been placed in the basket 10. Surprisingly, it was found that when the clam meat was subjected to steam treatment the matter present in the meat which causes the undesirable odor and taste is removed by volatilization. The foul odor characteristic of the normally inedible clams, very marked at the start of the steam treatment, was easily detected by smelling the vapors discharged from the top of heating column 12. After steam treatment for about 7 minutes the undesirable odor was no longer detected rising from the top of the heating column. This steam treatment is sufficient to volatilize all the unpleasant odor and taste causing matter from the meat. This phase of the procedure finally converts the meat into an edible food product.

Juice from the steam treatment of the clam meat condensed in the heating column and this juice was collected through outlet 14 in a beaker or other suitable receptacle. At the start of the steam treatment and throughout the entire steam treament the juice collected was pearly white. The juice was sampled repeatedly from its initial collection to the completion of the steam treatment and it had no unpleasant odor or taste. This indicates that the matter in the clam meat which causes the undesirable taste and odor is volatile and was removed by steam treatment or other volatilization procedures.

After the steam treatment, which resulted in clam meat free from any undesirable odor and taste, the meat was processed in the usual manner by placing it in a can together with a brine solution. The can was capped and retorted at 240° F. for about 1 hour to sterilize the meat. If desired, the brine solution may conveniently contain the clam juice obtained from the steam treatment step. It was found that the use of the clam juice in the brine solution enhances the flavor of the cooked clam meat.

By using the steam treatment described above, it is possible not only to use mahogany clams as a food product but also other species of clams, e.g. Red clams. Further, the process can be employed to treat clams found in polluted sewage and oil beds which have acquired an undesirable odor and taste, e.g. to treat surf clams found in such polluted beds.

Specific illustrative but non-limiting examples of the process of the present invention are as follows:

Example 1

A suitable quantity of frozen mahogany clam meat including the belly contents, obtained by removing with wire brushes the growth on the clam shell and subsequently shucking the meat from the clam shell in the manner heretofore described, was defrosted. This defrosted meat was debellied by slitting the peritoneum and washing away the bell contents with jets of cool water until the meat was free from any belly odor and taste. The mahogany clam meat was then ground to pieces of approximately ¼″ x ¼″ size.

The clam meat is placed in an apparatus such as shown in the drawing. The meat was placed in the wire basket in the heating column. Steam was bled in to the heating column and the foul odor characteristic of normally inedible mahogany clams was very marked at the start as detected by smelling the vapors being discharged from the top of the heating column. After about 6 minutes of steam treatment almost all of the unpleasant odor was gone and after 7 minutes no bad odor was detected as being discharged from the heating column. The steam treatment was discontinued at the end of 10 minutes.

The juice from the steam treated clam meat collected through the outlet in the heating column was pearly white from the beginning of the steam treatment. This juice was tested periodically as it was being collected and no detectable unpleasant odor or tests was present at any time. The clam meat obtained after steam treatment was free of all traces of the undesirable foul, fishy odor that is associated with normally inedible mahogany clams and the meat was quite white and clean in appearance.

To the clam juice recovered there was added 1.5 percent salt and 0.26 percent monosodium glutamate and this brine solution was brought to a boil. The clam meat was placed in cans, the cans filled with hot brine and capped. The cans were retorted for 90 minutes at 240° F. in hot water to sterilize the meat. After the sterilization the cans were opened and it was found that the meat was tender and the flavor excellent. There were no traces present of any undesirable taste or odor in the meat or juice and the meat tested like the usual canned quahog clams (*Venus mercenaria*).

A portion of the brine solution was also sterilized in a capped can without any clam meat being present. This sterilization was carried out at 240° F. for about 30 minutes. This cooked juice was very tasty.

Example 2

Mahogany clam meat which had been shucked, debellied, cleaned and ground in the same manner as described in Example 1, was placed in the wire basket in the heating column shown in the drawing and steam was passed into that column for 10 minutes. The steam treated clam meat recovered was free of the normal unpleasant odor and taste associated with mahogany clams. This meat was placed in cans. A brine solution consisting of water, 1.5 percent salt and 0.25 percent monosodium glutamate was prepared and heated to boiling. The hot brine was added to the recover meat and the cans were capped and retorted for 90 minutes at 240° F. in a hot water cooker. The following day the cans were opened and it was found that the meat was tender and the flavor excellent. No traces of the foul, fishy odor associated with mahogany clam meat prior to the steam treatment was present. The color of the meat was excellent and it tasted like the usual canned quahog clams.

A comparison of mahogany clam meat cooked in its own juice (Example 1) and that cooked in a normal brine solution (Example 2) indicates that the presence of clam juice renders the meat somewhat tastier.

Example 3

This example was run as a control to show the effect of omitting the steam treatment in the processing of mahogany clams.

Mahogany clam meat which has been shucked, debellied and cleaned in the same manner as described in Example 1, was ground into small pieces as previously described. A suitable quantity of this clam meat was placed in a can together with a brine solution consisting of water, 1.5 percent salt, and 0.25 percent monosodium glutamate. The can was capped and the contents of the can were retorted for 90 minutes in hot water at 240° F. to sterilize the meat.

After sterilization was completed the can was opened and the clam meat appeared in color like the usual quahog clam meat. However, the meat still retained the undesirable odor and taste associated iwth normally inedible mahogany clams. The juice obtained during this sterilization procedure had a yellow color and a taste similar to that of the meat. The yellow color of the juice indicates that the matter which causes the undesirable odor and taste in the meat and juice was still present.

A comparison of the processing of mahogany clams according to the present invention as described in Examples 1 and 2, and that employed in Example 3, demonstrates the surprising result achieved by steam treatment of the clam meat after debellying and prior to sterilization of the meat. This steam treatment converts normally inedible mahogany clams into edible clams.

The clam meat treated according to the process of the present invention may be used as a commercial product such as in clam chowder, clam tomato sauce, etc.

A Manhattan clam chowder was prepared containing the usual ingredients, employing mahogany clam meat obtained according to the process of the present invention. This clam chowder was found to have excellent taste and flavor, at least equal to that of clam chowder employing surf clam meat.

Other variations and embodiments will be apparent to those skilled in the art and it is accordingly desired that the scope of the invention not be limited to those embodiments particularly illustrated or suggested but that the scope of the invention be defined by reference to the appended claims.

What is claimed is:

1. A process for removing undesirable odor and taste from normally inedible clam meat to render said clam meat edible which comprises subjecting debellied clam meat to steam treatment for a sufficient length of time to volatilize the matter in said meat which cause said undesirable odor and taste and thereafter sterilizing said clam meat.

2. A process according to claim 1 wherein said clam meat is mahogany clam meat.

3. A process according to claim 2 wherein said steam is substantially moisture-free.

4. A process accirding to claim 2 including the step of collecting the juice resulting from said steam treatment of said clam meat.

5. A process according to claim 4 including the step of sterilizing the recovered clam juice and steam-treated clam meat in a capped container.

6. The process for rendering normally inedible mahogany clams suitable for human consumption which comprises removing the growth on the clam shell of said clams, separating the shell from the clam meat, removing the belly contents from said clam meat, subjecting the debellied clam meat to steam treatment for a sufficient length of time to volatilize the matter in said meat which imparts undesirable odor and taste thereto, and thereafter sterilizing said clam meat in a brine solution.

7. A process according to claim 6 wherein said belly contents are washed away from said clam meat with water.

8. A process according to claim 6 including the step of subjecting said clams to heat treatment for a short duration to facilitate removal of said clam meat from said clam shell, said heat treatment not being sufficient to cook said clam meat.

References Cited

Borgstrom: Fish as Food, March 1965, pp. 329–331, Academic Press, New York, N.Y.

Tressler et al.: Marine Products of Commerce, October 1950, pp. 576, 578, 580, 586–588, Reinhold Publishing Coropration, New York, N.Y.

A. LOUIS MONACELL, Primary Examiner

R. M. ELLIOTT, Assistant Examiner